United States Patent
Kerns et al.

(10) Patent No.: US 11,015,613 B2
(45) Date of Patent: May 25, 2021

(54) AERO LOADING SHROUD SEALING

(71) Applicant: General Electric Company, Schenectady, NY (US)

(72) Inventors: Daniel Patrick Kerns, Mason, OH (US); Dennis Paul Dry, Cincinnati, OH (US); Megan Elizabeth Scheitlin, Cincinnati, OH (US); Alexander Martin Sener, Cincinnati, OH (US); Jason David Shapiro, Methuen, MA (US)

(73) Assignee: General Electric Company, Schenectady, NY (US)

( * ) Notice: Subject to any disclaimer, the term of this patent is extended or adjusted under 35 U.S.C. 154(b) by 555 days.

(21) Appl. No.: 15/404,608

(22) Filed: Jan. 12, 2017

(65) Prior Publication Data

US 2018/0195403 A1    Jul. 12, 2018

(51) Int. Cl.
| F04D 29/52 | (2006.01) |
| F01D 25/24 | (2006.01) |
| F01D 11/08 | (2006.01) |
| F04D 29/08 | (2006.01) |

(52) U.S. Cl.
CPC ............ *F04D 29/526* (2013.01); *F01D 11/08* (2013.01); *F01D 25/246* (2013.01); *F04D 29/083* (2013.01); *F05D 2240/11* (2013.01); *F05D 2250/411* (2013.01); *F05D 2250/71* (2013.01); *F05D 2250/75* (2013.01); *F05D 2260/36* (2013.01); *F05D 2300/6033* (2013.01); *Y02T 50/60* (2013.01)

(58) Field of Classification Search
CPC .......... F01D 11/12; F01D 11/14; F01D 11/16; F01D 11/18; F01D 11/20; F01D 11/22; F01D 11/08; F01D 25/24; F01D 25/243; F01D 25/246; F01D 25/28; F05D 2240/11; F04D 29/08; F04D 29/083; F04D 29/16; F04D 29/164
See application file for complete search history.

(56) References Cited

U.S. PATENT DOCUMENTS

| 5,127,793 | A | 7/1992 | Walker et al. |
| 5,451,116 | A | 9/1995 | Czachor et al. |
| 5,762,472 | A | 6/1998 | Pizzi et al. |
| 6,884,026 | B2 * | 4/2005 | Glynn ................ F01D 11/08 415/113 |
| 8,753,073 | B2 | 6/2014 | Albers et al. |
| 9,322,415 | B2 | 4/2016 | Rioux |
| 9,587,517 | B2 * | 3/2017 | Vetters .................. F01D 25/246 |
| 9,915,163 | B2 * | 3/2018 | McCaffrey .............. F01D 11/22 |
| 10,041,369 | B2 * | 8/2018 | Blaney .................... F01D 11/24 |
| 10,378,386 | B2 * | 8/2019 | Roussille ................ F01D 11/18 |
| 2013/0266435 | A1 | 10/2013 | Foster et al. |

(Continued)

*Primary Examiner* — Ehud Gartenberg
*Assistant Examiner* — Jacek Lisowski
(74) *Attorney, Agent, or Firm* — Dority & Manning, P.A.

(57) ABSTRACT

A shroud assembly includes a shroud segment and a hanger. In one exemplary aspect, the shroud segment has a shroud body extending substantially along a circumferential direction between a first end and a second end. The shroud body defines a radial centerline along the circumferential direction. A flange is attached to or integral with the shroud body. The flange is pivotally coupled with the hanger at a location spaced from the radial centerline of the shroud body.

19 Claims, 7 Drawing Sheets

(56) References Cited

U.S. PATENT DOCUMENTS

| | | |
|---|---|---|
| 2014/0271142 A1 | 9/2014 | Albers et al. |
| 2016/0024970 A1 | 1/2016 | Zierer et al. |
| 2016/0069201 A1 | 3/2016 | Carr et al. |
| 2016/0084096 A1 | 3/2016 | Carr et al. |
| 2016/0097303 A1 | 4/2016 | Baldiga et al. |
| 2016/0115807 A1 | 4/2016 | Davis et al. |

* cited by examiner

AERO LOADING SHROUD SEALING

FEDERALLY SPONSORED RESEARCH

This invention was made with government support under contact number FA8650-15-D-2501 awarded by the Department of the Air Force. The U.S. government may have certain rights in the invention.

FIELD

The present subject matter relates generally to gas turbine engines. More particularly, the present subject matter relates to shroud assemblies for gas turbine engines.

BACKGROUND

Gas turbine engine performance and efficiency can be improved by increased combustion gas temperatures. However, increased combustion temperatures can negatively impact gas turbine engine components, for example, by increasing the likelihood of material failures. Accordingly, high temperature materials, such as ceramic matrix composite (CMC) materials, are being used for various components of the engine. In particular, shroud assemblies defining an outer boundary of the core air flowpath of the engine and circumferentially enclosing the rotor blades of various compressor and/or turbine stages of an engine can be formed of CMC material. For example, a shroud segment may be formed of a SiC/Si—SiC (fiber/matrix) CMC material.

Despite the use of CMC materials for some components of shroud assemblies, shroud assemblies typically include metallic-based spline seals that seal adjacent shroud segments of the shroud ring. As engine cycle temperatures continue to increase, metallic-based spline seals are exposed to temperatures beyond current material capability. As a result, excess leakage and cooling between and around shroud segments occur, decreasing engine performance and efficiency.

Therefore, an improved shroud assembly for a gas turbine would be desirable. In particular, a shroud assembly that reduces or eliminates the need for spline seals and that has minimal leakage and cooling between and around each shroud segment of the shroud assembly would be beneficial.

BRIEF DESCRIPTION

Exemplary aspects of the present disclosure are directed to shroud assemblies that include a shroud segment that is pivotably coupled with a corresponding hanger. In this way, the shroud segment pivots when it experiences an aero moment, engaging the shroud segment in sealing communication with an adjacent shroud segment. Aspects and advantages of the invention will be set forth in part in the following description, or may be obvious from the description, or may be learned through practice of the invention.

In one exemplary aspect, the present disclosure is directed to a shroud assembly defining an axial direction, a radial direction, and a circumferential direction. The shroud assembly includes a hanger and a shroud segment. The shroud segment extends substantially along the circumferential direction and defines a radial centerline along the circumferential direction. The shroud segment is pivotally coupled with the hanger at a location spaced from the radial centerline.

In another exemplary aspect, the present disclosure is directed to a gas turbine engine. The gas turbine engine defines an axial direction, a radial direction, and a circumferential direction. The gas turbine engine includes a compressor section, a combustion section, and a turbine section in serial flow relationship and together define a core air flowpath. The gas turbine engine also includes a shroud assembly positioned in at least one of the compressor section and the turbine section. The shroud assembly at least partially defines the core air flowpath and includes a hanger and a shroud segment. The shroud segment includes a shroud body extending substantially along the circumferential direction and defines a radial centerline along the circumferential direction. The shroud segment also includes a flange attached to or formed integrally with the shroud body. The flange is pivotally coupled with the hanger at a location spaced from the radial centerline of the shroud body.

In a further exemplary aspect, the present disclosure is directed to a method for operating a gas turbine engine. The gas turbine engine defines an axial direction, a radial direction, and a circumferential direction and includes a shroud ring having a plurality of shroud segments disposed substantially about the circumferential direction, each shroud segment has an inner side and an outer side and each shroud segment is pivotably coupled to a hanger. The method includes operating the gas turbine engine to create a pressure differential between the inner side and the outer side of each shroud segment such that each shroud segment pivots about the axial direction in such a way that each shroud segment is in sealing communication with an adjacent shroud segment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
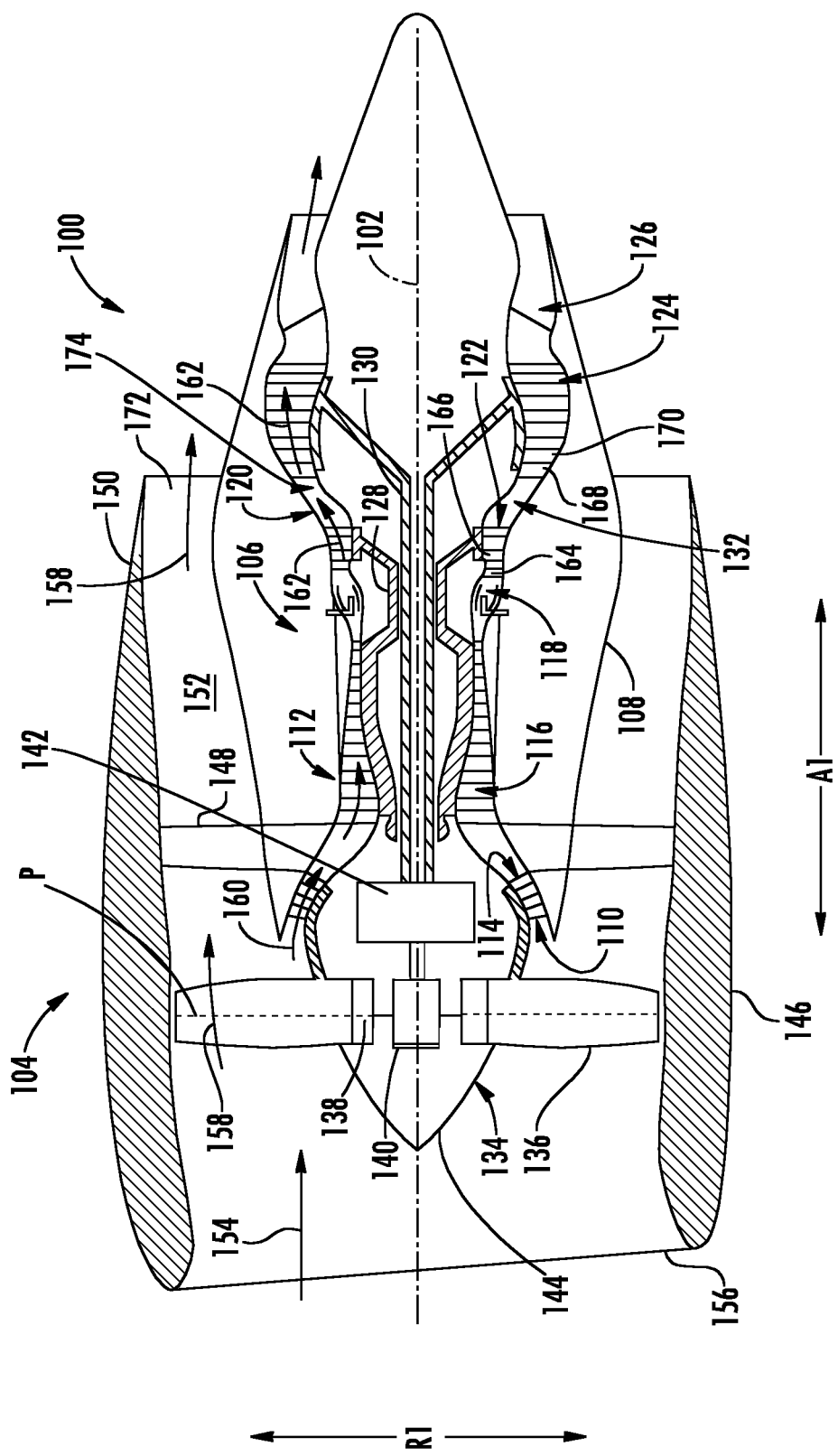
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Exemplary aspects of the present disclosure are directed to shroud assemblies that include a shroud segment pivotably coupled with a hanger. During operation of a gas turbine engine, the shroud segment experiences an aero moment caused by a pressure differential. As the shroud segment is pivotably coupled with the hanger, the aero moment causes the shroud segment to pivot, engaging the shroud segment in sealing communication with an adjacent shroud segment. A shroud ring is formed of a plurality of circumferentially arranged shroud segments sealed in the radial direction by aero moments acting on each shroud segment. Thus, in one respect, the need for a spline seal to radially seal adjacent shroud segments may be reduced or eliminated. This may effectively: reduce the number of components in the shroud assembly, reduce the complexity of the assembly, eliminate or reduce the need to create slots or slits that receive the spline seals in each shroud segment, and also may eliminate the need for cooling systems for cooling the spline seals. In another respect, where the shroud segments leverage the aero moment caused by the pressure differential, no additional parts are necessary. Improved sealing in the radial direction may result in improved engine performance and efficiency.

Referring now to the drawings, FIG. 1 is a schematic cross-sectional view of a gas turbine engine 100 in accordance with an exemplary embodiment of the present disclosure. More particularly, for the embodiment of FIG. 1, the gas turbine engine 100 is an aeronautical, high-bypass turbofan jet engine configured to be mounted to an aircraft, such as in an under-wing configuration or tail-mounted configuration. As shown in FIG. 1, the gas turbine engine 100 defines an axial direction A1 (extending parallel to or coaxial with a longitudinal centerline 102 provided for reference), a radial direction R1, and a circumferential direction C1 (i.e., a direction extending about the axial direction A1; not depicted in FIG. 1). In general, the gas turbine engine 100 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section 112 including a first, booster or LP compressor 114 and a second, HP compressor 116; a combustion section 118; a turbine section 120 including a first, HP turbine 122 and a second, LP turbine 124; and a jet exhaust nozzle section 126. A HP shaft or spool 128 drivingly connects the HP turbine 122 to the HP compressor 116. A LP shaft or spool 130 drivingly connects the LP turbine 124 to the LP compressor 114. The compressor section, combustion section 118, turbine section, and jet exhaust nozzle section 126 together define a core air flowpath 132 through the core turbine engine 106.

Referring still the embodiment of FIG. 1, the fan section 104 includes a variable pitch fan 134 having a plurality of fan blades 136 coupled to a disk 138 in a circumferentially spaced apart manner. As depicted, the fan blades 136 extend outwardly from disk 138 generally along the radial direction R. Each fan blade 136 is rotatable relative to the disk 138 about a pitch axis P by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by LP shaft 130 across a power gear box 142. The power gear box 142 includes a plurality of gears for stepping down the rotational speed of the LP shaft 130 to a more efficient rotational fan speed.

Referring still to the exemplary embodiment of FIG. 1, the disk 138 is covered by rotatable front nacelle 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the core turbine engine 106. Moreover, for the embodiment depicted, the nacelle 146 is supported relative to the core turbine engine 106 by a plurality of circumferentially spaced outlet guide vanes 148. Further, a downstream section 150 of the nacelle 146 extends over an outer portion of the core turbine engine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air 154 as indicated by arrows 158 is directed or routed into the bypass airflow passage 152 and a second portion of the air 154 as indicated by arrow 160 is directed or routed into the LP compressor 114. The pressure of the second portion of air 160 is then increased as it is routed through the high pressure (HP) compressor 116 and into the combustion section 118.

Referring still to FIG. 1, the compressed second portion of air 160 from the compressor section mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the core turbine engine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define a hot gas path 174 for routing the combustion gases 162 through the core turbine engine 106.

It will be appreciated that the exemplary gas turbine engine 100 depicted in FIG. 1 is by way of example only, and that in other exemplary embodiments, the gas turbine engine 100 may have any other suitable configuration. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aeroderivative gas turbine engine, such as a nautical gas turbine engine.

Figure 2:
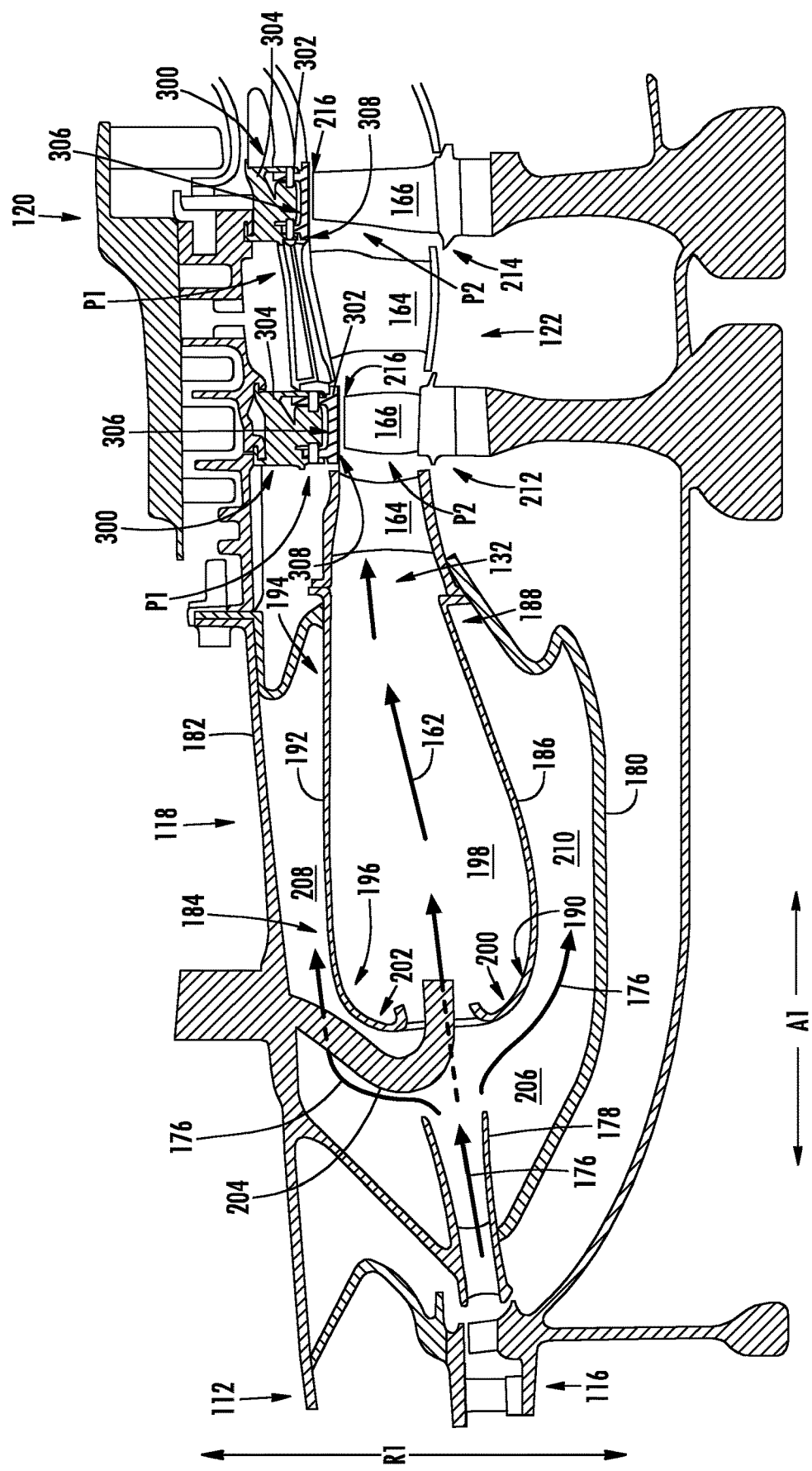
FIG. 2 is a side cross-sectional view of a compressor section, a combustion section, and a high pressure turbine section of the gas turbine engine shown in FIG. 1.

FIG. 2 provides a side cross-sectional view of the compressor section 112, combustion section 118, and the turbine section 120 of the core turbine engine 106 of FIG. 1. More specifically, the rear end of the HP compressor 116, the combustor section 118, and the forward end of the HP turbine 122 are illustrated.

Compressed air 176 exits the HP compressor 116 through a diffuser 178 located at the rear end or outlet of the HP compressor 116 and diffuses into the combustion section 118. The combustion section 118 of core turbine engine 106 is annularly encased by radially inner and outer combustor casings 180, 182. The radially inner combustor casing 180 and the radially outer combustor casing 182 both extend generally along the axial direction A1 and surround a combustor assembly 184 in annular rings. The inner and outer combustor casings 180, 182 are joined together at annular diffuser 178 at the forward end of the combustion section 118.

As shown, the combustor assembly 184 generally includes an inner liner 186 extending between a rear end 188 and a forward end 190 generally along the axial direction A1, as well as an outer liner 192 also extending between a rear end 194 and a forward end 196 generally along the axial direction A1. The inner and outer liners 186, 192 together at least partially define a combustion chamber 198 therebetween. The inner and outer liners 186, 192 are each attached to or formed integrally with an annular dome. More particularly, the annular dome includes an inner dome section 200 formed integrally with the forward end 190 of the inner liner 186 and an outer dome section 202 formed generally with the forward end 196 of the outer liner 192. Further, the inner and outer dome section 200, 202 may each be formed integrally (or alternatively may be formed of a plurality of components attached in any suitable manner) and may each extend along the circumferential direction C1 to define an annular shape. It should be appreciated, however, that in other embodiments, the combustor assembly 184 may not include the inner and/or outer dome sections 200, 202; may include separately formed inner and/or outer dome sections 200, 202 attached to the respective inner liner 186 and outer liner 192; or may have any other suitable configuration.

Referring still to FIG. 2, the combustor assembly 184 further includes a plurality of fuel air mixers 204 spaced along the circumferential direction C1 and positioned at least partially within the annular dome. More particularly, the plurality of fuel air mixers 204 are disposed at least partially between the outer dome section 202 and the inner dome section 200 along the radial direction R1. Compressed air 176 from the compressor section 112 of the gas turbine engine 100 flows into or through the fuel air mixers 204, where the compressed air 176 is mixed with fuel and ignited to create combustion gases 162 within the combustion chamber 198. The inner and outer dome sections 200, 202 are configured to assist in providing such a flow of compressed air 176 from the compressor section 112 into or through the fuel air mixers 204.

As discussed above, the combustion gases 162 flow from the combustion chamber 198 into and through the turbine section 120 of the gas turbine engine 100, where a portion of thermal and/or kinetic energy from the combustion gases 162 is extracted via sequential stages of turbine stator vanes and turbine rotor blades within the HP turbine 122 and LP turbine 124. More specifically, as is depicted in FIG. 2, combustion gases 162 from the combustion chamber 198 flow into the HP turbine 122, located immediately downstream of the combustion chamber 198, where thermal and/or kinetic energy from the combustion gases 162 is extracted via sequential stages of HP turbine stator vanes 164 and HP turbine rotor blades 166.

As illustrated in FIG. 2, not all compressed air 176 flows into or directly through the fuel air mixers 204 and into combustion chamber 198. Some of the compressed air 176 is discharged into a plenum 206 surrounding the combustor assembly 184. Plenum 206 is generally defined between the combustor casings 180, 182 and the liners 186, 192. The outer combustor casing 182 and the outer liner 192 define an outer plenum 208 generally disposed radially outward from the combustion chamber 198. The inner combustor casing 180 and the inner liner 186 define an inner plenum 210 generally disposed radially inward with respect to the combustion chamber 198. As compressed air 176 is diffused by diffuser 178, some of the compressed air 176 flows radially outward into the outer plenum 208 and some of the compressed air 176 flows radially inward into the inner plenum 210.

The compressed air 176 flowing radially outward into the outer plenum 208 flows generally axially to the turbine section 120. Specifically, the compressed air 176 flows above the HP turbine 122 stator vanes and rotor blades 164, 166. The outer plenum 208 may extend to the LP turbine 124 (FIG. 1) as well.

As further shown in FIG. 2, the HP turbine 122 includes one or more shroud assemblies 300, each of which forms an annular shroud ring about an annular array of HP turbine rotor blades 166. In this example, an annular shroud ring is circumferentially disposed around the annular array of rotor blades 166 of a first stage 212 of HP turbine 122, and an annular ring is circumferentially disposed around the annular array of turbine rotor blades 166 of the second stage 214. In general, the shrouds or shroud segments of the shroud assemblies 300 are radially spaced from blade tips 216 of each of the rotor blades 166. The shroud assemblies 300 generally reduce radial leakage into and out of the core air flowpath 132 and may also reduce axial leakage.

Each shroud assembly 300 includes a shroud segment 302 and a hanger 304. The shroud segment 302 is positioned radial outward from blade tips 216 of each of the rotor blades 166 and at least partially defines the core air flowpath 132. Each shroud segment 302 includes a radially outer side 306 and a radially inner side 308. Each shroud segment 302 is coupled to a corresponding hanger 304. The hangers 304 couple each shroud segment 302 to the outer casing 182.

It should be noted that shroud assemblies 300 may additionally be utilized in a similar manner in the LP compressor 114, HP compressor 116, and/or LP turbine 124. Accordingly, shroud assemblies 300 as disclosed herein are not limited to use in HP turbines 122, and rather may be utilized in any suitable section of gas turbine engine 100 or turbine engine more generally.

The compressed air 176 flowing through the outer plenum 208 has a pressure P1 that exerts a radially inward force on the outer side 306 of shroud segment 302. The combustion gases 162 flowing through the hot gas path 174 of the HP turbine 122 has a pressure P2 that exerts a radially outward force on the inner side 308 of the shroud segment 302. It will be appreciated that P1 is generally greater than P2 during operation of gas turbine engine 100 with respect to this section of the core turbine engine 106. The difference in pressure between P1 and P2 will be referred to herein as the pressure differential. It will also be appreciated that in some circumstances, such as when gas turbine engine 100 is not in operation or when gas turbine engine 100 experiences a stall, that P1 may not be greater than P2.

Moreover, in the event outer plenum 208 or like chamber is positioned in the compressor section 112, it will be appreciated that the pressure P1 of the air within the outer plenum or chamber that exerts a radially inward force on the outer side 306 of shroud segment 302 may be less than the pressure P2 that exerts a radially outward force on the inner side 308 of the shroud segment 302. Thus, the resultant pressure force acting on the shroud segment 302 in the compressor section 112, which is generally radially outward, is reversed from that of the turbine section 120, where the resultant pressure force acting on the shroud segment 302 is directed generally radially inward during operation of gas turbine engine 100.

Figure 3:
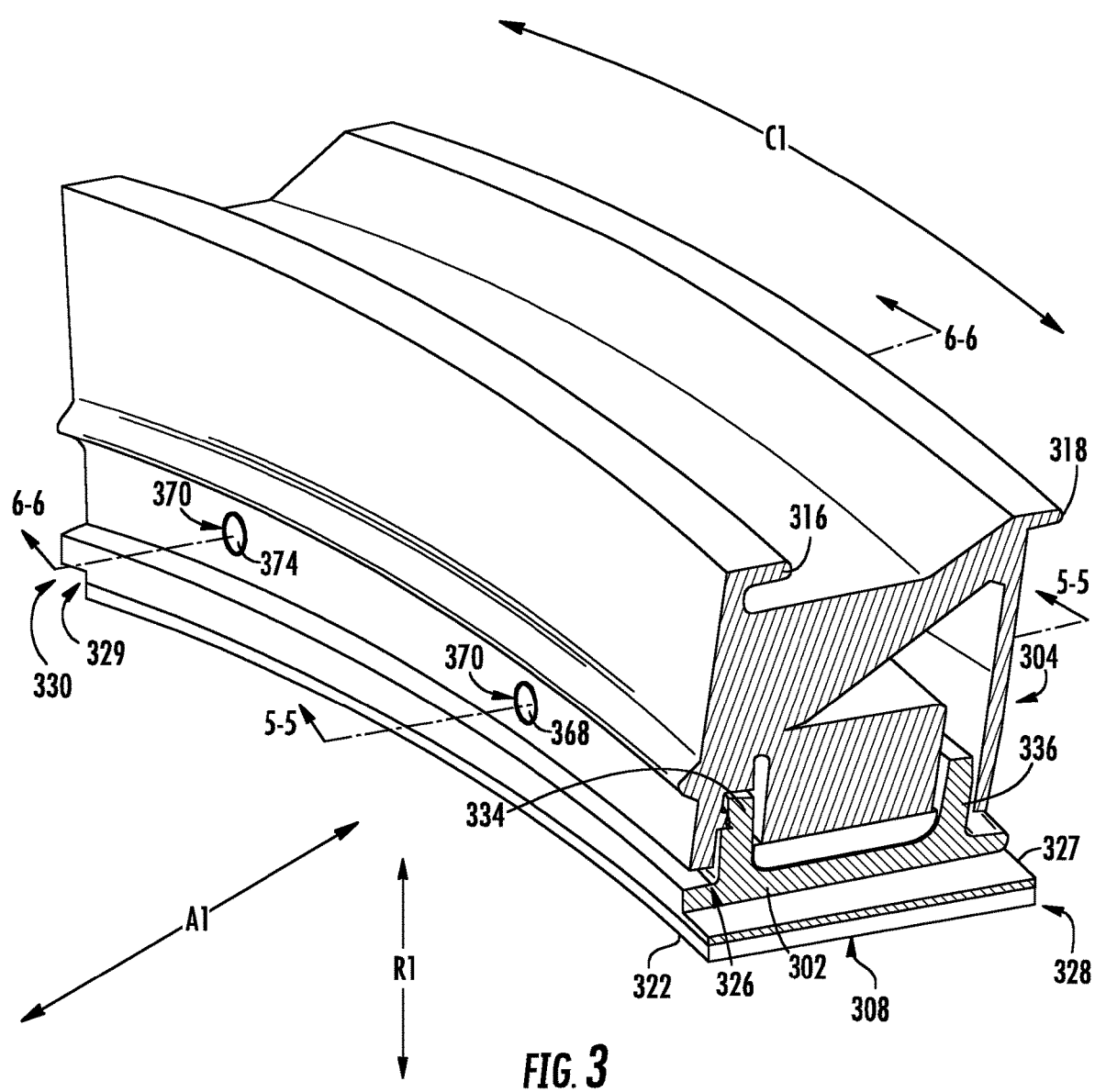
FIG. 3 is a perspective view of an exemplary shroud assembly.

FIG. 3 provides a perspective view of an exemplary shroud assembly 300. Shroud assembly 300 is positioned in at least one of the compressor section 112 and the turbine section 120 and at least partially defines the core air flowpath 132. By way of example, shroud assemblies 300 can be located circumferentially enclosing the rotor blades 166 of HP turbine 122, as shown in FIG. 2. In other embodiments, shroud assemblies 300 can be located in other sections or locations within gas turbine engine 100.

For this embodiment, the shroud assembly 300 includes shroud segment 302 coupled with hanger 304. Hanger 304 is coupled with and supports the shroud segment 302 in the gas turbine engine 100, and is itself supported by various other components in the gas turbine engine 100. The hanger 304 may be a multi-piece hanger or may be formed of a single piece. In this exemplary embodiment, shroud hanger 304 is a single-piece hanger. The hanger 304 has a forward hanger arm 316 and a rear hanger arm 318. The rear arm 318 is axially spaced from the forward arm 316, as shown. The hanger arms 316, 318 couple the shroud assembly 300 to the outer casing 182 (FIG. 2). Shroud assembly 300 may include a baffle (not shown). Baffle may be disposed radially between the hanger 304 and the shroud segment 302. Baffle may include a body that defines a plurality of cooling holes for routing fluid therethrough, such as for cooling purposes. A ceramic-based abradable material 322 coated with an environmental barrier coating (EBC) is disposed along the inner side 308 of the shroud segment 302.

Moreover, as shown in FIG. 3, shroud segment 302 has a female attachment configuration 328. The female attachment configuration 302 has an extension portion 327 that extends outwardly in the circumferential direction C1 from a sidewall 326 of the shroud segment 302 and along the inner side 308 of the shroud segment 302. On the end of the shroud segment 302 opposite the female attachment configuration 328, shroud segment 302 includes a male attachment configuration 330. Male attachment configuration 330 has a recessed portion 329 defined along the circumferential direction C1 along the inner side 308 of the shroud segment 302. When shroud segments 302 are arranged circumferentially in a ring, the recessed portion 329 of the male attachment configuration 330 of each shroud segment 302 is configured to receive a corresponding extension portion 327 of a female attachment configuration 328 of an adjacent shroud segment. In this way, the female attachment configuration 328 and male attachment configuration 330 form a shiplap joint 400 (FIG. 7) when one shroud segment 302 is mated in sealing communication with an adjacent shroud segment.

Figure 4:
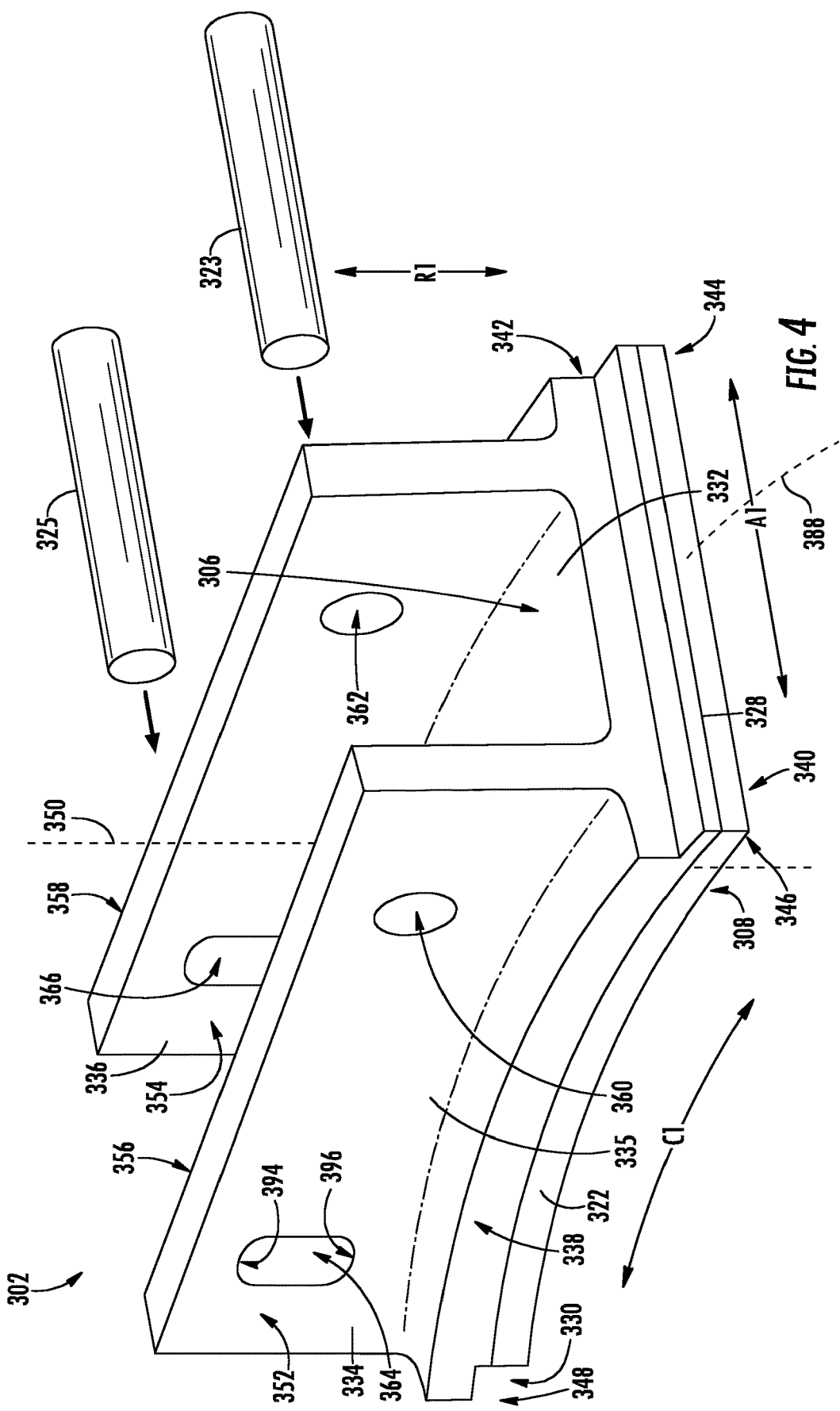
FIG. 4 is a perspective view of an exemplary shroud segment.

With reference now to FIG. 4, a perspective view of an exemplary shroud segment 302 is provided. Shroud segment 302 includes a shroud body 332, a forward flange 334, and a rear flange 336. In particular, in exemplary embodiments, shroud body 332 and flanges 334, 336 may be integral and thus generally formed as a single component. In alternative embodiments, flanges 334, 336 may be attached to shroud body 332. In some exemplary embodiments, the shroud body 332 and flanges 334, 336 may be formed of a CMC material, which is a non-metallic material having high temperature capability. Exemplary CMC materials utilized for such components may include silicon carbide (SiC), silicon nitride, or alumina matrix materials and/or combinations thereof. In alternative embodiments, the shroud body 332 and flanges 334, 336 (and shroud assembly 300 in general) may be formed from another suitable material, such as a metal.

Shroud body 332 includes a forward surface 338 located at the forward end 340 of the shroud body 332 and a rear surface 342 positioned at the rear end 344 of the shroud body 332. Shroud body 332 extends along the axial direction A1 from the forward end 340 to the rear end 344, and thus, the rear surface 342 is axially spaced from the forward surface 338. A circumferential centerline 388 is defined midway between the forward end 340 and rear end 344. The radially inner side 308 and the radially outer side 306 of the shroud body 332 each extend between the forward surface 338 and the rear surface 342. The outer side 306 is radially spaced from the inner side 308. Inner side 308 is exposed to the hot gas path 174 (FIG. 1) when shroud assembly 300 (FIG. 2) is positioned in the turbine section 120, while outer side 306 is thus radially spaced from the hot gas path 174.

The shroud body 332 extends in a lengthwise direction substantially along the circumferential direction C1 between a first end 346 and a second end 348. The shroud body 332 defines a radial centerline 350 along the circumferential direction C1. The radial centerline 350 is positioned midway between the ends of the shroud segment 302. As shown, the first end 346 has a female attachment configuration 328 and the second end 348 has a male attachment configuration 330. When shroud segments 302 are arranged circumferentially so as to form a shroud ring, the female attachment configuration 328 of one shroud segment 302 is configured to be in sealing communication with the male attachment configuration 330 of an adjacent shroud segment, as noted above. In other embodiments, the first end 346 of the shroud body 332 has the male attachment configuration 330 and the second end 348 has the female attachment configuration 328.

Forward flange 334 and rear flange 336 each extend from the shroud body 332, such as from the outer side 306 thereof. More specifically, the forward and rear flanges 334, 336 both extend radially outward from shroud body 332 along the radial direction R1. Rear flange 336 is axially spaced from forward flange 334. Further, forward flange 334 is generally positioned proximate the forward end 340 of the body 332, while rear flange 336 is generally positioned proximate the rear end 344 of the body 332. Each flange 334, 336 may include a forward surface 352, 354, respectively, and a rear surface 356, 358, respectively. As shown, the flanges 334, 336 each extend along the length of the shroud body 332 in the circumferential direction C1.

In other exemplary embodiments, forward flange and/or rear flange need not extend the entire length of the shroud segment 302 along the circumferential direction C1. By way of an example, a center flange portion 335 may be removed for material savings and/or weight reduction purposes (see e.g., FIG. 7). As shown more clearly in FIG. 7, a flange may extend radially outward from the shroud body 332 at a location spaced from the radial centerline 350 toward the first end 346 and a flange may extend radially outward from the shroud body 332 at a location spaced from the radial centerline 350 toward the second end 348. Additionally, both forward and rear flanges or other flanges may extend radially outward from the shroud body 332 in this fashion.

Referring still to FIG. 4, forward flange 334 includes a forward opening 360. Forward opening 360 is defined by forward flange 334 and extends between the forward and rear surfaces 352, 356 of the forward flange 334. In this embodiment, forward opening 360 is located spaced from the radial centerline 350 of the shroud body 332. More specifically, forward opening 360 is spaced circumferentially from the radial centerline 350 toward the first end 346 of shroud body 332.

Rear flange 336 includes a rear opening 362. Rear opening 362 is defined by rear flange 336 and extends between the forward and rear surfaces 354, 358 of rear flange 336. In this embodiment, rear opening 362 is located spaced from the radial centerline 350 of the shroud body 332. More specifically, rear opening 362 is spaced circumferentially from the radial centerline 350 toward the first end 346 of the shroud body 332. Moreover, rear opening 362 is positioned coaxially with forward opening 360. In this manner, a single pin 323 may be inserted through both forward opening 360 and rear opening 362 to couple shroud segment 302 with hanger 304. As shown, single pin 323 is generally cylindrical and openings 360, 362 are generally circular or round and are complementary to single pin 323. The circumferential bearing surfaces of the single pin 323 and openings 360, 362 allow for the shroud segment 302 to be pivotably coupled with the hanger 304. Specifically, these bearing surfaces allow for free pivotal movement of shroud segment 302 such that is may be in mating communication with an adjacent shroud segment 302 during operation of gas turbine engine 100. It will be appreciated that single pin 323 and openings 360, 362 may be other suitable shapes as well.

Forward flange 334 also includes a forward slot 364. Forward slot 364 is defined by forward flange 334 and extends axially between the forward and rear surfaces 352, 356 of the forward flange 334 and radially from a first end 394 (i.e., the top of the slot in this embodiment) to a second end 396 opposite that of first end 394 (i.e., the bottom of the slot in this embodiment). In this example, the forward slot 364 is located spaced from the radial centerline 350 of the shroud body 332. More specifically, forward slot 364 is spaced circumferentially from the radial centerline 350 toward the second end 348 of shroud body 332. Thus, forward slot 364 is spaced circumferentially from the radial centerline 350 in a direction opposite the circumferential direction C1 in which forward opening 360 is spaced from radial centerline 350. In other embodiments, forward slot 364 can be spaced from forward opening 360 at any location between forward opening 360 and second end 348. For instance, forward slot 364 can be spaced circumferentially from the radial centerline 350 proximate the second end 348 of shroud body 332. Forward slot 364 may be a generally oblong shape as shown in FIG. 4 or forward slot 364 may be other suitable shapes, such as a generally arcuate shape.

Rear flange 336 also includes a rear slot 366. Rear slot 366 is defined by rear flange 336 and extends between the forward and rear surfaces 354, 358 of the rear flange 336. In this embodiment, rear slot 366 is located spaced from the radial centerline 350 of the shroud body 332. More specifically, rear slot 366 is spaced circumferentially from the radial centerline 350 toward the second end 348 of shroud body 332. Accordingly, rear slot 366 is spaced circumferentially from the radial centerline 350 in a direction opposite the circumferential direction C1 in which rear opening 362 is spaced from radial centerline 350. In other embodiments, rear slot 366 can be spaced from rear opening 362 at any location between rear opening 362 and second end 348. For example, rear slot 366 can be spaced circumferentially from the radial centerline 350 proximate the second end 348 of shroud body 332. Rear slot 366 may be a generally oblong shape as shown or rear slot 366 may be other suitable shapes, such as a generally arcuate shape. Moreover, rear slot 366 is positioned generally aligned with forward slot 364. In this manner, a single pin 325 may be inserted through both forward slot 364 and rear slot 366. As depicted, the single pin 325 is generally cylindrical. In other exemplary embodiments, forward slot 364 and rear slot 366 may be offset from one another yet may still allow for single pin 325 to be inserted therethrough.

Single pin 325 may be coupled with hanger 304 at one or both of its ends (not shown in FIG. 4). In this way, single pin 325 is fixed with respect to the hanger 304. However, single pin 325 is not fixed within forward and rear slots 364, 366. Rather, single pin 325 is selectively engageable with the first end 394 and the second end 396 of each of the slots 364, 366. As the second end 348 of the shroud segment 302 is not fixed (and the first end 346 of the shroud segment 302 is pivotably coupled with the hanger 304 by single pin 323), when shroud segment 302 experiences a resultant force due to the pressure differential during operation of the engine, the second end 348 of shroud segment 302 may pivot radially inward or outward. Indeed, during operation of gas turbine engine 100, single pin 325 may not contact shroud segment 302 at all. Rather, front and rear slots 364, 366 constrain the range of movement of the second end 348 of shroud segment 302, preventing the second end 348 from pivoting radially inward or outward too far. In this manner, the single pin 325 is selectively engageable with shroud segment 302.

It will be appreciated that forward opening 360 can be spaced from the radial centerline 350 toward the second end 348 of shroud body 332 and that forward slot 364 can be spaced from the radial centerline 350 in a direction opposite that of the forward opening 360, or toward the first end 346. Likewise, it will be appreciated that rear opening 362 can be spaced from the radial centerline 350 toward the second end 348 of shroud body 332 and that rear slot 366 can be spaced from the radial centerline 350 in a direction opposite that of the rear opening 362, or toward the first end 346.

Figure 5:
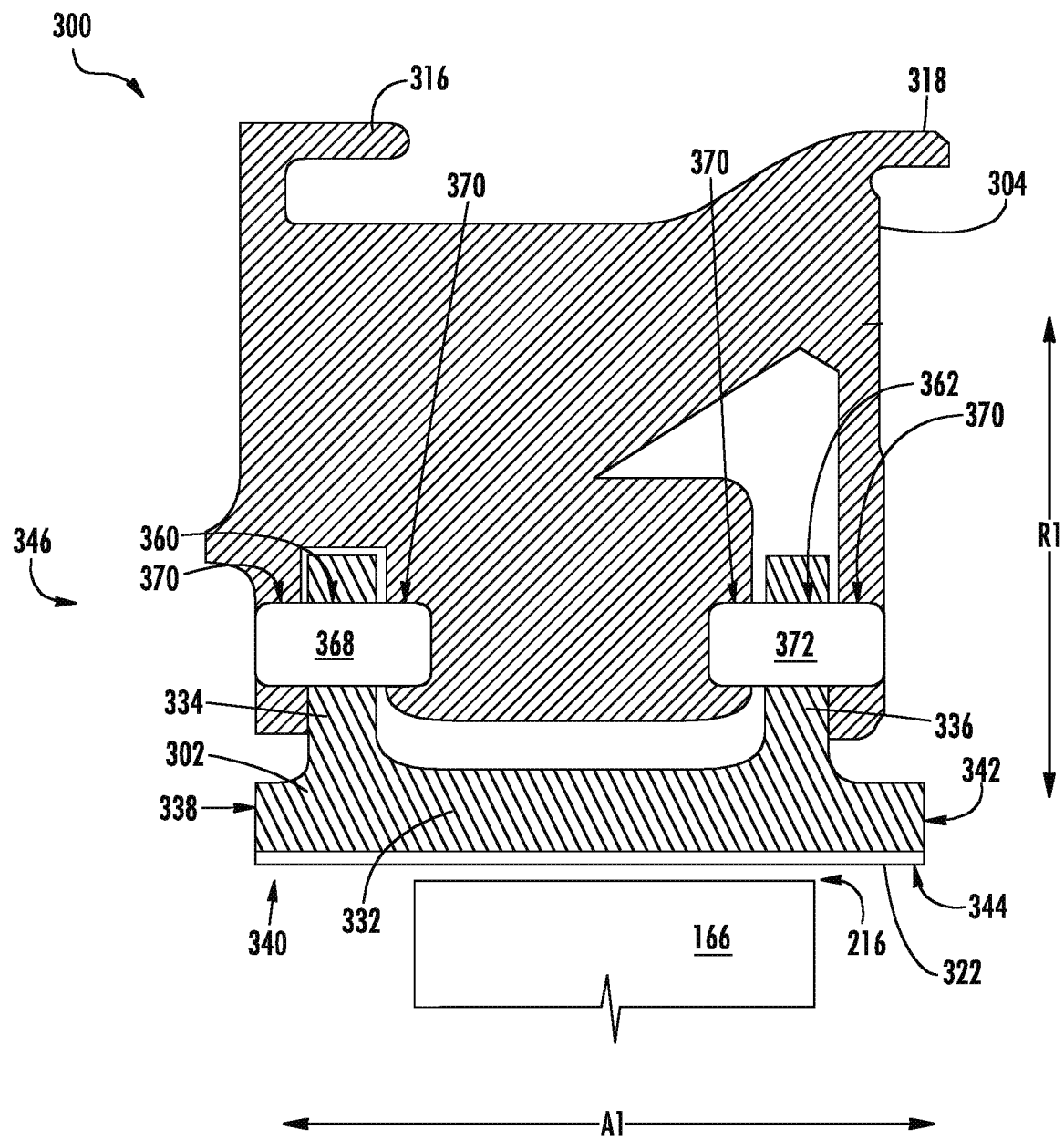
FIG. 5 is a partial side, cross-sectional view taken on line 5-5 of the shroud assembly of FIG. 3.

FIG. 5 is a partial side, cross-sectional view taken on line 5-5 of the shroud assembly 300 of FIG. 3. Specifically, FIG. 5 details the coupling of shroud segment 302 with hanger 304 according to exemplary aspects of the present subject matter.

In this exemplary embodiment, forward flange 334 extends radially outward from shroud body 332 proximate forward end 340, and forward opening 360 extends through forward flange 334. Forward opening 360 receives a first forward pin 368. First forward pin 368 is a generally cylindrical pin. First forward pin 368 couples forward flange 334 with hanger 304. In particular, hanger 304 has hanger openings 370 positioned in alignment with forward opening 360. Hanger openings 370 are generally circular or round in shape and are complementary to first forward pin 368. First forward pin 368 is received in the hanger openings 370 and extends through forward opening 360 to couple forward flange 334 with hanger 304. As will be explained more fully below, the first forward pin 368 or first forward bearing allows for shroud segment 302 to pivot about the axial direction A1. In this manner, shroud segment 302 is pivotably coupled with hanger 304.

Rear flange 336 extends radially outward from shroud body 332 proximate rear end 344, and rear opening 362 extends through rear flange 336. Rear opening 362 receives a first rear pin 372. First rear pin 372 is generally cylindrical. First rear pin 372 couples rear flange 336 with hanger 304. In particular, hanger 304 has hanger openings 370 positioned in alignment with rear opening 362. Hanger openings 370 are generally circular or round and are complementary to the first rear pin 372. First rear pin 372 is received in the hanger openings 370 of hanger 304 and extends through the rear opening 362 of rear flange 336 to couple rear flange 336 with hanger 304. As will be explained more fully below, the first rear pin 372 or first rear bearing allows for shroud segment 302 to pivot about the axial direction A1. In this manner, shroud segment 302 is pivotably coupled with hanger 304. In this embodiment, forward opening 360 and rear opening 362 are aligned coaxially with one another and the corresponding hanger openings 370 are likewise coaxially aligned.

Figure 6:
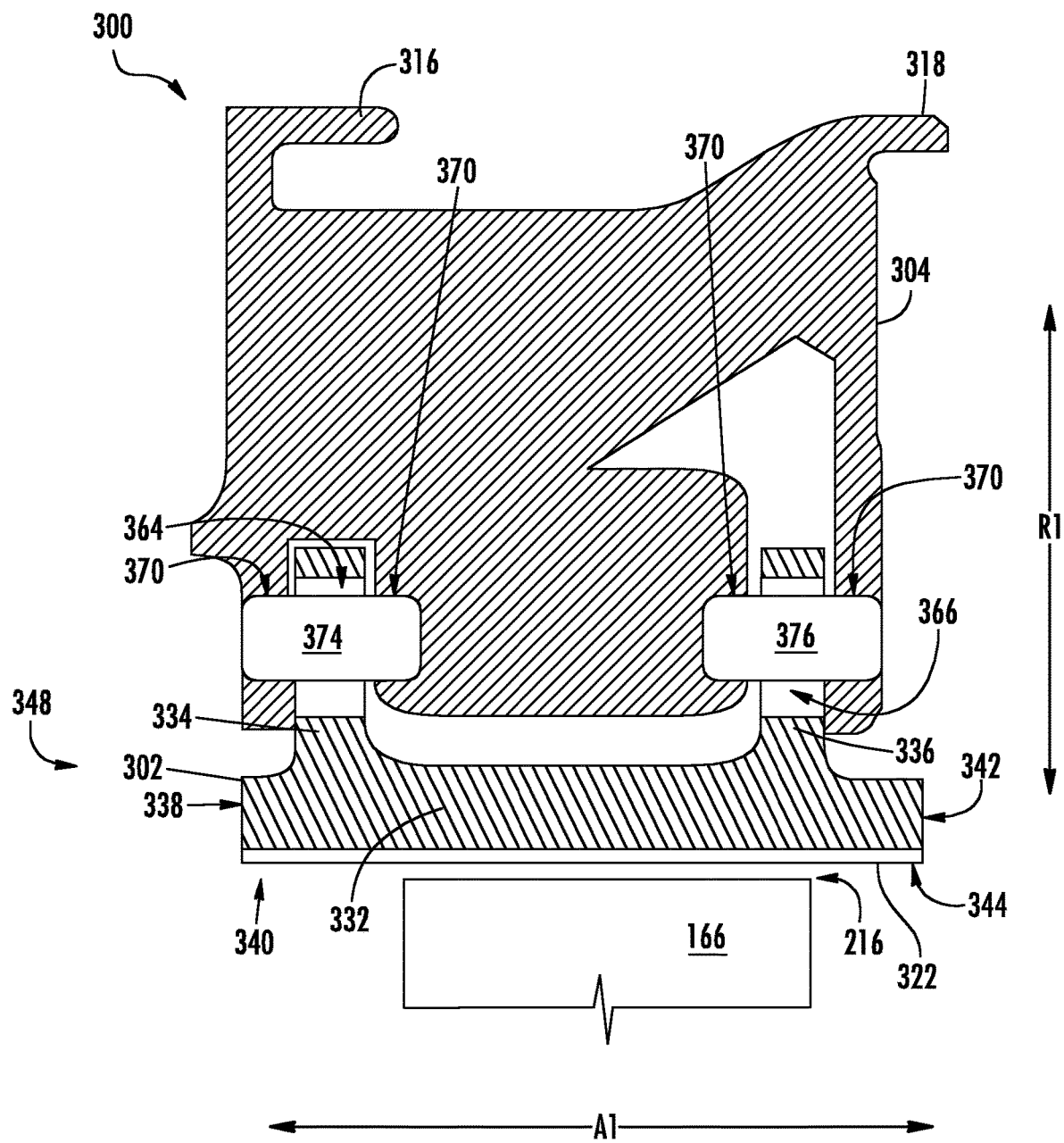
FIG. 6 is a partial side, cross-sectional view taken on line 6-6 of the shroud assembly of FIG. 3.

FIG. 6 is a partial side, cross-sectional view taken on line 6-6 of the shroud assembly 300 of FIG. 3. Specifically, FIG. 6 details the second end 348 of shroud segment 302 and hanger 304 according to exemplary aspects of the present subject matter.

Forward flange 334 is shown extending radially outward from shroud body 332 proximate forward end 340 and is positioned between segments of hanger 304. Forward slot 364 extends through forward flange 334, as noted above. A second forward pin 374 extends through forward slot 364. The second forward pin 374 is shown as generally cylindrical, but other suitable shapes are also contemplated. Hanger 304 has hanger openings 370 for receiving second forward pin 374. Second forward pin 374 extends through the forward slot 364.

More particularly, second forward pin 374 is selectively engageable with the first end 394 and second end 396 of forward slot 364. Meaning, second forward pin 374 is not fixed within forward slot 364. When shroud segment 302 pivots about the axial direction A1 during operation of gas turbine engine 100, the second end 348 of shroud segment 302 may move generally radially inward or outward depending on whether shroud assembly 300 is located with the compression section 112 or the turbine section 120, among other factors. During operation of gas turbine engine 100, second forward pin 374 may not contact shroud segment 302 at all. Forward slot 364 constrains the range of movement of second end 348 of shroud segment 302, preventing the second end 348 of shroud segment 302 from pivoting radially inward or outward too far, such as when gas turbine engine 100 is not in operation and when gas turbine engine 100 experiences a stall. In this manner, the forward flange 336 of shroud segment 302 is selectively engageable with second front pin 374 and in turn hanger 304 at the second end 348 of shroud segment 302.

Rear flange 336 is shown extending radially outward from shroud body 332 proximate rear end 344 and is positioned between segments of hanger 304. Rear slot 366 extends through rear flange 336, as noted above. A second rear pin 376 extends through rear slot 366. Second rear pin 376 is shown as generally cylindrical, but other suitable shapes are also contemplated. Hanger 304 has hanger openings 370 for receiving second rear pin 376. Second rear pin 376 extends through the rear slot 366.

More specifically, second rear pin 376 is selectively engageable with the first end 394 and second end 396 of rear slot 366 in a similar way as second forward pin 374 is selectively engageable with forward slot 364. Second rear pin 376 is not fixed within forward slot 364. When shroud segment 302 pivots about the axial direction A1 during operation of gas turbine engine 100, the second end 348 of shroud segment 302 may pivot or move radially inward or outward. During operation of gas turbine engine 100, second rear pin 376 may not contact shroud segment 302 at all. Rear slot 366 constrains the range of movement of second end 348 of shroud segment 302, preventing the second end 348 of shroud segment 302 from pivoting radially inward or outward too far. In this manner, the rear flange 336 of shroud segment 302 is selectively engageable with second rear pin 376 and in turn hanger 304 at the second end 348 of shroud segment 302. It will be appreciated that forward slot 364 and rear slot 366 may be aligned with one another and that the corresponding hanger openings 370 will likewise be aligned.

In some exemplary embodiments, forward slot 364 and rear slot 366 are not included in shroud assembly 300. In such other embodiments, some other means may be used to prevent shroud segment 302 from radially pivoting too far radially inward or outward.

Figure 7:
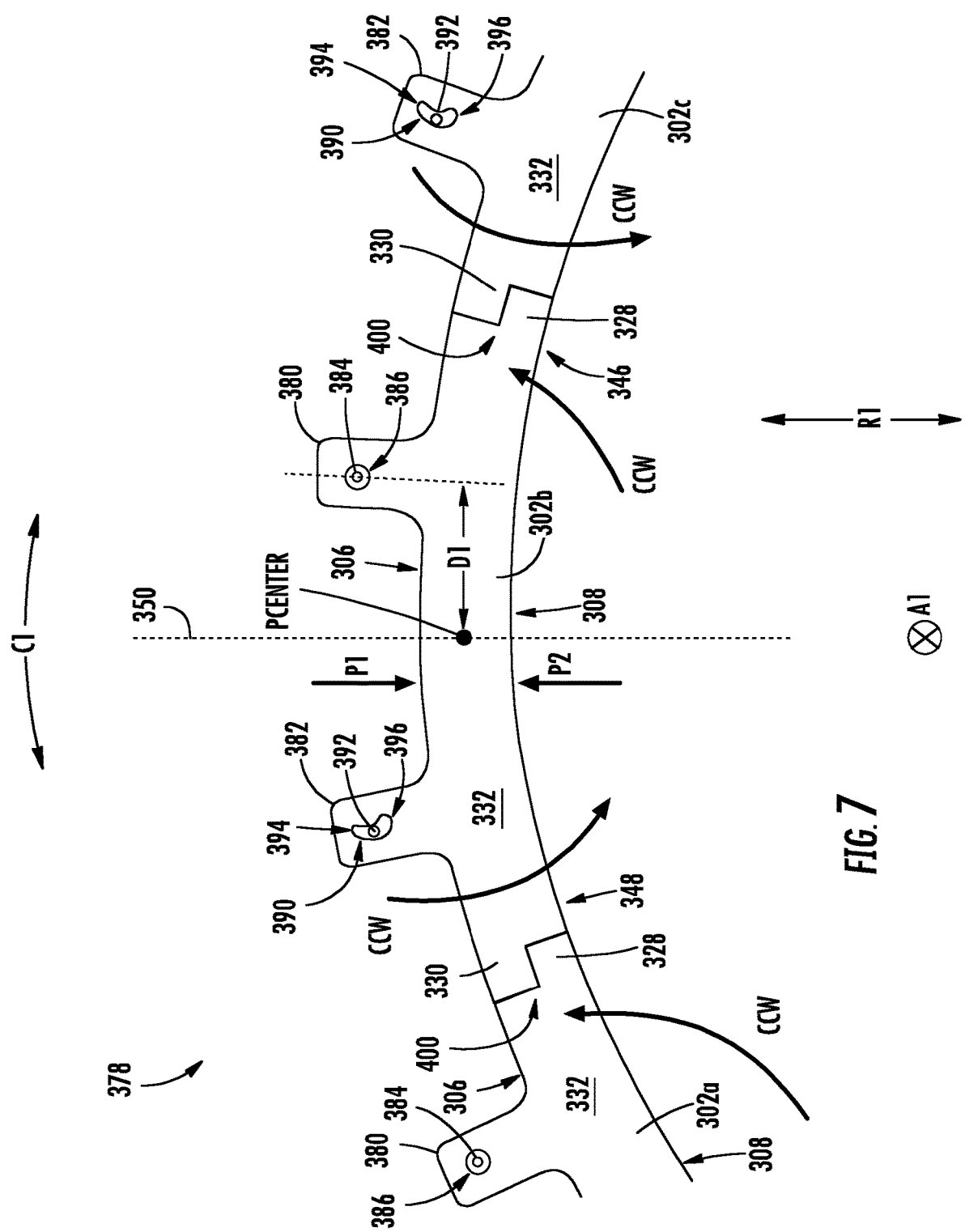
FIG. 7 is a forward-looking rear view of exemplary shroud segments in sealing communication with one another.

FIG. 7 provides a forward-looking rear view of exemplary shroud segments 302 in sealing communication with one another. In particular, FIG. 7 shows shroud segments 302 in sealing communication with one another forming a part of a shroud ring 378. From left to right in FIG. 7, shroud ring 378 includes a first shroud segment 302a, a second shroud segment 302b, and a third shroud segment 302c. It will be appreciated that not all of the shroud segments 302 of shroud ring 378 are shown. In addition, hangers 304 have been omitted for clarity.

For this embodiment, each shroud segment 302a, 302b, and 302c includes a first flange 380 and a second flange 382 extending from their respective shroud bodies 332. Specifically, the flanges 380, 382 extend radially outward from their respective shroud bodies 332. First flange 380 may extend from forward end 340, rear end 344, or somewhere in between. Likewise, second flange 382 may extend from forward end 340, rear end 344, or somewhere in between.

Each shroud segment 302a, 302b, 302c includes a female attachment configuration 328 extending from their respective first ends 346 and a male attachment configuration 330 extending from their respective second ends 348. In particular, the female attachment configurations 328 and the male attachment configurations 330 are both rabbets, or step-shaped recesses. As shown in FIG. 7, the rabbets of the female and male attachment configurations 328, 330 are complementary to one another when one shroud segment is in sealing communication with an adjacent shroud segment. In this respect, the female attachment configuration 328 and the male attachment configuration 330 of an adjacent shroud segment form a shiplap joint 400 when they are in mating communication. In some exemplary embodiments, other male and female attachment configurations 328, 330 are possible. For example, male and female attachment configurations could form a curved joint, a dovetailed joint, a mitered-rabbet or beveled-rabbet joint (i.e., where the step-shaped recesses are not at right angles), etc.

Second shroud segment 302b includes first flange 380 attached to or formed integrally with the shroud body 332 at a location spaced from the radial centerline 350 toward the first end 346 of the shroud body 332. The first flange 380 is pivotally coupled to hanger 304 (not shown in FIG. 7). In particular, a first pin 384 is received within an opening 386 for pivotally coupling the shroud segment 302 to shroud hanger in a manner noted above with respect to the other embodiments. For this embodiment, first flange 380 is positioned axially proximate circumferential centerline 388 (FIG. 4).

Second shroud segment 302b also includes a second flange 382 attached to or formed integrally with the shroud body 332 and spaced from the first flange 380 in the circumferential direction C1. For this embodiment, second flange 382 is positioned proximate circumferential centerline 388 (FIG. 4) and spaced from the radial centerline 350 toward the second end 348 of the shroud body 332.

The second flange 382 is selectively engageable with the shroud hanger (not shown in FIG. 7). Specifically, second flange 382 includes a slot 390. In this embodiment, slot 390 is an arcuate shape. The arcuate slot 390 bows circumferentially toward the second end 348 of shroud segment 302, as second shroud segment 302b is pivotably coupled toward its first end 346. This may allow for a greater range of pivotal movement of shroud segment 302b. In other configurations, slot 390 may bow circumferentially toward the first end 346 of shroud segment 302 (e.g., when second shroud segment 302b is pivotably coupled toward its second end 346 and slot 390 is located toward the first end 346).

A second pin 392 extends through the slot 390 and is selectively engageable with the first end 394 and second end 396 of the slot 390 in a manner noted above with respect to the other embodiments. When second shroud segment 302 pivots about the axial direction A1, the second end 348 of shroud segment 302 moves generally radially inward or outward. Slot 390 allows for this movement, but constrains the pivot range of second end 348 of shroud segment 302. Particularly, second pin 392 can engage a first end 394 or a second end 396 of slot 390, preventing the second end 348 of shroud segment 302 from pivoting radially inward or outward too far. In this manner, where gas turbine engine 100 is not being operated or during a stall, for example, slot 390 of second flange 382 prevents shroud segment 302 from an undesirable amount of radially movement. Thus, for this embodiment, second pin 392 extending through slot 390 does not support the shroud segments 302a, 302b, and 302c during typical engine operation, but may, in certain circumstances, engage and support shroud segment 302.

As mentioned previously, during operation of gas turbine engine 100 and where shroud assembly 300 is positioned in the turbine section 120, compressed air 176 within outer plenum 208 has a pressure P1 that exerts a radially inward force on an outer side 306 of shroud segment 302. The pressure P2 within the hot gas path 174 exerts a radially outward force on an inner side 308 of shroud segment 302. During operation of gas turbine engine 100, pressure P1 is generally greater than pressure P2. In this way, the resultant force on shroud segment 302 is a radially inward force. As first flange 380 pivotably couples shroud segment 302 to hanger (not shown), the resultant force creates an aero moment on second shroud segment 302b, causing second shroud segment 302b to rotate about axial direction A1 in a counter-clockwise direction CCW, as shown in FIG. 7. Consequently, male attachment configuration 330 located at the second end 348 of second shroud segment 302b is forced radially inward and is pressed against a female attachment configuration 328 of an adjacent shroud segment, which is first shroud segment 302a in this example. In this manner, male attachment configuration 330 of second shroud segment 302b is in sealing communication with female attachment configuration 328 of first shroud segment 302a.

In this embodiment, the sealing communication of the male attachment configuration 330 and the female attachment configuration 328 forms a shiplap joint 400. It will be appreciated that any spaces depicted between the male attachment configuration 330 and the female attachment configuration 328 that form the shiplap joints 400 in FIG. 7 are for illustrated purposes only and that when male attachment configuration 330 and female attachment configuration 328 are in sealing communication with one another, that one or more surfaces of each configuration will be in mating communication with one another such that sealing communication is achieved.

Due to the aero moment on second shroud segment 302b, first end 346 of second shroud segment 302b likewise pivots in a CCW direction and is forced against an adjacent shroud segment. In particular, the female attachment configuration 328 of second shroud segment 302b is forced radially outward with respect to longitudinal centerline 102 such that female attachment configuration 328 of second shroud segment 302b is in sealing communication with male attachment configuration 330 of an adjacent shroud segment, which is third shroud segment 302c in this example. Sealing communication is achieved in part because third shroud segment 302c likewise experiences an aero moment in the same fashion as second shroud segment 302b. In this way, third shroud segment 302c pivots about the axial direction A1 in the counter-clockwise direction CCW, causing the male attachment configuration 330 of third shroud segment 302c to be forced radially inward. Each shroud segment 302 forming the annular shroud ring 378 experiences a like aero moment, allowing for the shroud ring 378 to be sealed in the radial direction R1.

It will be appreciated that depending on the direction of the aero moment (or the direction of the resultant force on the shroud segments) that the shroud segments 302 of shroud ring 378 may pivot in a clockwise direction. It will also be appreciated that if shroud segments are pivotably coupled at their respective second ends 348 instead of at their first ends 346, that the shroud segments 302 would pivot in the clockwise direction.

Each shroud segment 302 disposed about the circumferential direction C1 has a center of pressure $P_{CENTER}$, which may be proximate or at the radial centerline 350, for example. It will be appreciated that by adjusting the circumferential distance D1 between the center of pressure $P_{CENTER}$ and the first pin 384 that the aero moment on the shroud segments 302 may be tuned. By moving the first pin 384 closer to the center of pressure $P_{CENTER}$ (by also moving the corresponding openings), the magnitude of the aero moment is decreased; and thus, less sealing force will be applied to the shroud segments 302. In contrast, by moving the first pin 384 further away from the center of pressure $P_{CENTER}$ (by also moving the corresponding openings), the magnitude of the aero moment will increase; and thus, more sealing force will be applied to the shroud segments 302.

Optionally, although not shown, each shroud segment forming the shroud ring may include slits or slots along the sidewalls of both the first end and second end of the shroud body or flanges. A spline seal, preferably made of CMC material, is then inserted into the slits to act as a redundant measure for sealing the shroud ring. Spline seals may be made of other suitable materials as well, such as metal, etc.

In another exemplary aspect of the present disclosure, although not shown, a shroud assembly defines an axial direction, a radial direction, and a circumferential direction. The shroud assembly includes a hanger and a shroud segment. The shroud segment defines a radial centerline along the circumferential direction. For this embodiment, the hanger includes a flange attached to or formed integrally with the hanger. The shroud segment is pivotally coupled with the flange of the hanger at a location spaced from the radial centerline.

In still another exemplary embodiment, although not show, a shroud assembly defines an axial direction, a radial direction, and a circumferential direction. The shroud assembly includes a hanger and a shroud segment. The shroud segment includes a shroud body and defines a radial centerline along the circumferential direction. For this embodiment, the shroud body of the shroud segment is pivotally coupled with the hanger at a location spaced from the radial centerline. For example, the shroud body could include an opening that receives a pin coupled with the hanger.

In yet another exemplary aspect of the present disclosure, a method for operating a gas turbine engine 100 is provided. Although the method is described below in the context of gas turbine engine 100, the method may nevertheless be used or practiced with other types of engines that include shroud assemblies 300 in accordance with exemplary aspects of the present subject matter.

The exemplary method includes: operating gas turbine engine 100 to create a pressure differential between the inner side 308 and the outer side 306 of each shroud segment 302 such that each shroud segment 302 pivots about the axial direction A1 in such a way that each shroud segment 302 is in sealing communication with an adjacent shroud segment. By way of example, where shroud assembly 300 is located within the turbine section 120, the pressure differential between the pressure P1 within the outer plenum 208 and the pressure P2 within the hot gas path 174 of the turbine section 120 causes an aero moment on the shroud segment 302. And because shroud segment 302 is pivotably coupled to hanger 304, the shroud segment 302 pivots about the axial direction A1. The pivoting of each shroud segment 302 of the shroud ring 378 causes each shroud segment 302 to be in sealing communication with an adjacent shroud segment, as depicted in FIG. 7.

Although various embodiments described herein discuss various examples for implementing the pivotal coupling of an exemplary shroud segment with an exemplary hanger, it will be appreciated that other structures and methods of pivotably coupling the shroud segment to the hanger are contemplated. Specifically, any suitable structure that allows for the shroud segment to pivot with respect to the hanger when an aero moment is experienced during operation of the engine is contemplated. For example, other suitable types of bearings, bushings, joints, connections, linkages, mounts, sockets, rotatable arms, the like, or any suitable combination of the foregoing may be used. By way of example, shroud segment could include a boss protruding from its surface that mates with a bearing, such as a pin, of the hanger to allow for pivotable movement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud assembly defining an axial direction, a radial direction, and a circumferential direction, comprising:
    a hanger;
    a shroud segment extending substantially along the circumferential direction and defining a radial centerline along the circumferential direction, the shroud segment pivotally coupled with the hanger at a location spaced from the radial centerline;
    a shroud body extending substantially along the circumferential direction between a first end of the shroud body and a second end of the shroud body; and
    a flange attached to or formed integrally with the shroud body, the flange defining a slot located spaced from the radial centerline toward the second end of the shroud body, wherein the slot is an arcuate shape extending along the radial direction, and wherein the slot includes a first slot end and a second slot end spaced away from the first slot end in the radial direction, and the slot is configured to receive a slot pin that is selectively engageable between the first slot end and the second slot end in the radial direction.

2. The shroud assembly of claim 1, wherein the shroud body defines the radial centerline along the circumferential direction; and wherein the flange pivotally couples the shroud body with the hanger at a location spaced from the radial centerline.

3. The shroud assembly of claim 2, wherein the flange defines an opening, the shroud assembly further comprising:

an opening pin coupled to the hanger and extending through the opening and wherein the flange is pivotally coupled with the hanger by the opening pin.

4. The shroud assembly of claim 2, wherein the shroud body extends substantially along the axial direction between a forward end of the shroud body and a rear end of the shroud body, the flange positioned proximate the forward end of the shroud body, the shroud assembly further comprising:
 a rear flange positioned proximate the rear end of the shroud body, the rear flange pivotally coupled with the hanger at a location spaced from the radial centerline of the shroud body.

5. The shroud assembly of claim 4, wherein the flange and the rear flange are pivotally coupled with the hanger at a coaxial location spaced from the radial centerline.

6. The shroud assembly of claim 2, wherein the flange is pivotally coupled with the hanger at a location spaced from the radial centerline toward the first end, and wherein the shroud assembly further comprises:
 the slot pin coupled to the hanger and extending through the slot, and wherein the first slot end and the second slot end are selectively engageable with the slot pin.

7. The shroud assembly of claim 2, wherein the shroud body extends substantially along the axial direction between a forward end of the shroud body and a rear end of the shroud body, the flange positioned proximate the forward end of the shroud body and pivotally coupled with the hanger at a location spaced from the radial centerline toward the first end of the shroud body, the shroud assembly further comprising:
 a rear flange positioned proximate the rear end of the shroud body and pivotally coupled with the hanger at a location spaced from the radial centerline toward the first end of the shroud body, the rear flange defining a rear slot located spaced from the radial centerline toward the second end of the shroud body, the rear slot having a first rear slot end and a second rear slot end;
 the slot pin coupled to the hanger and extending through the slot, the slot pin selectively engageable with the first slot end and the second slot end of the slot; and
 a slot rear pin coupled to the hanger and extending through the rear slot, the slot rear pin selectively engageable with the first rear slot end and the second rear slot end of the rear slot.

8. The shroud assembly of claim 1, wherein the shroud segment forms a part of a shroud ring comprised of a plurality of the shroud segments arranged along the circumferential direction, each shroud segment of the plurality of the shroud segments extending substantially along the circumferential direction between a first end of said each shroud segment of the plurality of the shroud segments and a second end of said each shroud segment of the plurality of the shroud segments, the first end of said each shroud segment of the plurality of the shroud segments having a female attachment configuration and the second end of said each shroud segment of the plurality of the shroud segments having a male attachment configuration, the male attachment configuration of said each shroud segment of the plurality of the shroud segments in sealing communication with the female attachment configuration of an adjacent shroud segment.

9. The shroud assembly of claim 8, wherein said each shroud segment of the plurality of the shroud segments comprises a shroud body extending substantially along the radial direction between an outer side of the shroud body and an inner side of the shroud body, wherein:
 the male attachment configuration defines a recessed portion along the inner side of the shroud body of said each shroud segment of the plurality of the shroud segments; and
 the female attachment configuration comprises an extension portion extending along the inner side of the shroud body of said each shroud segment of the plurality of the shroud segments, wherein the extension portion of the female attachment configuration of said each shroud segment of the plurality of the shroud segments is complementary to the recessed portion of the male attachment configuration of the adjacent shroud segment.

10. The shroud assembly of claim 1, wherein the shroud segment is pivotally coupled with the hanger proximate the first end of the shroud body.

11. A gas turbine engine defining an axial direction, a radial direction, and a circumferential direction, comprising:
 a compressor section, a combustion section, and a turbine section in serial flow relationship and together defining a core air flowpath; and
 a shroud assembly positioned in at least one of the compressor section and the turbine section and at least partially defining the core air flowpath, the shroud assembly comprising a hanger and a shroud segment, the shroud segment comprising:
  a shroud body extending substantially along the circumferential direction between a first end of the shroud body and a second end of the shroud body and defining a radial centerline along the circumferential direction; and
  a flange attached to or formed integrally with the shroud body, the flange pivotally coupled with the hanger at a location spaced from the radial centerline of the shroud body, the flange including a pivot point located spaced along the circumferential direction from the radial centerline toward the first end of the shroud body and defining a slot located spaced from the radial centerline toward the second end of the shroud body, wherein the slot is an arcuate shape extending along the radial direction, and wherein the slot includes a first slot end and a second slot end spaced away from the first slot end in the radial direction, and the slot is configured to receive a slot pin that is selectively engageable between the first slot end and the second slot end in the radial direction.

12. The gas turbine engine of claim 11, wherein the second end of the shroud body having a female attachment configuration and the first end of the shroud body having a male attachment configuration, and wherein the shroud segment forms a part of a shroud ring comprised of a plurality of the shroud segments extending substantially along the circumferential direction, and wherein the male attachment configuration of each shroud segment of the plurality of the shroud segments is configured to be in sealing communication with the female attachment configuration of an adjacent shroud segment during operation of the gas turbine engine.

13. The gas turbine engine of claim 12, wherein the male attachment configuration and the female attachment configuration form a shiplap joint between each of the plurality of the shroud segments of the shroud ring when the male attachment configuration is in sealing communication with the female attachment configuration of the adjacent shroud segment.

14. The gas turbine engine of claim 11, wherein the flange defines an opening, the shroud assembly further comprising:
- an opening pin coupled to the hanger and extending through the opening and wherein the flange is pivotally coupled with the hanger by the opening pin.

15. The gas turbine engine of claim 11, wherein the shroud assembly is positioned in the compressor section.

16. The gas turbine engine of claim 11, wherein the shroud body extends substantially along the axial direction between a forward end of the shroud body and a rear end of the shroud body, wherein the flange is positioned proximate the forward end of the shroud body and pivotally coupled with the hanger at a location spaced from the radial centerline toward the first end of the shroud body, the shroud assembly further comprising:
- a rear flange positioned proximate the rear end of the shroud body and pivotally coupled with the hanger at a location spaced from the radial centerline toward the first end of the shroud body, the rear flange defining a rear slot located spaced from the radial centerline toward the second end of the shroud body, the rear slot having a first rear slot end and a second rear slot end; and the slot pin is coupled to the hanger and extends through the slot and the rear slot, and wherein the first and the second slot end of the slot and the first and the second rear slot end of the rear slot are selectively engageable with the slot pin.

17. The gas turbine engine of claim 11, wherein the shroud body extends substantially along the axial direction between a forward end of the shroud body and a rear end of the shroud body, the flange positioned proximate the forward end of the shroud body, the shroud assembly further comprising:
- a rear flange positioned proximate the rear end of the shroud body, the rear flange pivotally coupled with the hanger at a location spaced from the radial centerline of the shroud body.

18. The gas turbine engine of claim 17, wherein the flange and the rear flange are pivotally coupled with the hanger at a coaxial location spaced from the radial centerline.

19. The gas turbine engine of claim 14, wherein the flange defines the opening located spaced from the radial centerline toward the first end of the shroud body opposite the slot, and wherein the opening is a circular shape.

* * * * *